United States Patent [19]
Smith et al.

[11] Patent Number: 5,718,650
[45] Date of Patent: Feb. 17, 1998

[54] HYDRAULIC TENSIONER WITH POROUS VENT

[75] Inventors: Franklin R. Smith, Cortland; Stanley K. Dembosky, Ithaca, both of N.Y.

[73] Assignee: Borg-Warner Automotive, Inc., Sterling Heights, Mich.

[21] Appl. No.: 723,638

[22] Filed: Oct. 3, 1996

[51] Int. Cl.⁶ .................................................. F16H 7/08
[52] U.S. Cl. ............................................................. 474/110
[58] Field of Search ................................. 474/101–103, 474/104–105, 110

[56] References Cited

U.S. PATENT DOCUMENTS

| | | |
|---|---|---|
| 3,228,674 | 1/1966 | Wustenhagen . |
| 4,504,251 | 3/1985 | Mittermeier ............... 474/110 |
| 4,874,352 | 10/1989 | Suzuki ........................ 474/110 |
| 5,259,820 | 11/1993 | Mott ........................... 474/110 |
| 5,277,664 | 1/1994 | Mott ........................... 474/110 |
| 5,314,388 | 5/1994 | Suzuki et al. ............... 474/110 |
| 5,346,436 | 9/1994 | Hunter et al. .............. 474/110 |

FOREIGN PATENT DOCUMENTS 46-28575-B  8/1971  Japan .

*Primary Examiner*—Roger J. Schoeppel
*Attorney, Agent, or Firm*—Sidley & Austin; Greg Dziegielewski

[57] ABSTRACT

A hydraulic tensioner having a porous vent formed of sintered powder metal adapted to permit air to readily escape from within the tensioner while inhibiting air ingestion during cycling and limiting oil leakage. The vent is located within an aperture of the plunger near the highest point of the tensioner or at the top of the spring within the interior space of the plunger. Alternatively, the air vent may be located at the oil supply inlet before the oil enters the tensioner's fluid chamber.

4 Claims, 3 Drawing Sheets

HYDRAULIC TENSIONER WITH POROUS VENT

BACKGROUND OF THE INVENTION

The present invention relates to a hydraulic chain tensioner having a piston longitudinally movable in a fluid chamber and more particularly, to a porous air vent to permit the escape of air from inside the fluid chamber in such hydraulic chain tensioner.

Hydraulic tensioners are typically used as a control device for a chain drive in an automobile engine timing system. The tension in the chain can vary greatly due to the wide variation in the temperature and the linear expansion among the various parts of the engine. Moreover, wear to the chain components during prolonged use can produce a decrease in the tension of the chain. A hydraulic tensioner is used to take up the slack in the chain or belt that connects the camshafts to the crankshaft of the engine timing system.

A typical hydraulic tensioner is comprised of a housing having a bore, a fluid chamber defined by the bore, and a piston biased in a protruding direction from the bore by a spring. A check valve is also included in the hydraulic tensioner to permit fluid flow from a reservoir or oil supply passage into the fluid chamber, while preventing back flow in the reverse direction. The force of the chain against the piston in an inward direction is balanced by the resistance force of the fluid and the force of the spring in an outward direction.

A potential problem with hydraulic tensioners is that the fluid pressure inside of the hydraulic bore may change due to the introduction of air into the fluid. If air, a compressible fluid, becomes trapped inside the fluid chamber, the tensioner will not be fully effective in providing a load against the chain. Therefore, it is desirable to purge any air from the fluid chamber of the tensioner.

One method of venting air is described in Mittermeier, U.S. Pat. No. 4,504,251. Mittermeier discloses a tensioner with a hollow piston longitudinally guided in a hydraulic housing closed off by a plug provided with an external thread. The plug is pressed into a smooth central bore of the piston, and the thread grooves communicate with the atmosphere through radial channels, which permits venting of the housing. Another venting possibility exists through an excess pressure valve built into an ante-chamber arranged parallel to the piston. This excess pressure valve opens when the oil pressure exceeds a predetermined maximum in order to permit the oil and air mixture that accumulates in the upper part of the ante-chamber to exit into the atmosphere. The mixture, which flows continuously at a low flowing force, is guided toward the chain by a spraying pipe and used for the lubrication of the chain.

Another method for venting air disclosed in Hunter et al., U.S. Pat. No. 5,346,436, which is incorporated herein by reference, uses an air vent in the piston of the tensioner. The tensioner housing has a fluid filled chamber, a hollow plunger with an aperture in its upper end slidably received within the chamber and biased in a protruding direction by a spring, and a check valve provided between the chamber and the source of fluid pressure. The air vent comprises a disk biased by the spring against the inside of the upper end of the plunger. The vent disk has a channel formed between the atmosphere and the fluid reservoir. The channel has a first end at the outside of the disk and a second end at a position that connects the atmosphere and the chamber through the aperture in the plunger. To control fluid flow from the chamber and to restrict or minimize the quantity of air entering the chamber, the channel has a circuitous path from the first end to the second end. In addition, the aperture may contain a restricting member to further restrict the flow of fluid from the chamber and a rack and ratchet assembly to provide a mechanical no-return function.

Similarly, the vent of the present invention allows the escape or venting of air through a vent in the upper end of the piston or in the oil supply inlet. However, the vent of the present invention is porous and formed of sintered powder metal. The porous nature of the sintered powdered metal allows air to pass through quickly, but due to the higher viscosity of oil, limits the flow rate of oil. High air flow is desired through the vent to purge the air quickly, while restricting outward oil flow to maintain good control of the timing drive system. The air flow can be increased by altering the shape of the vent.

SUMMARY OF THE INVENTION

The present invention is directed to a hydraulic chain tensioner having a porous air vent. The tensioner includes housing with a central bore, which forms a fluid filled chamber. A hollow plunger is slidably received within the bore and creates a fluid chamber with the bore. The plunger, or piston, is biased in a protruding direction from the housing by a spring.

In one example of the tensioner, the plunger has an upper end with an aperture. A vent of sintered powder metal is provided within the upper end of the plunger. Additionally, the vent is preferably cylindrical and used within the aperture of the plunger at the highest point of the tensioner.

A passage is provided in the housing to connect the chamber with a source of fluid pressure. A check valve is provided between the chamber and the source of fluid pressure to permit fluid flow into the chamber, while blocking flow in the reverse direction. The check valve may be a ball and spring check valve, a spring valve, or a variable orifice check valve, as presently known in the tensioner art.

The tensioner may also include a rack and ratchet assembly that provides a mechanical no-return function. The rack moves outward with the plunger, and the ratchet is biased by a spring into meshing engagement with the rack to provide a no-return function. The no-return function prevents retraction of the piston into the bore when the engine is not operating and fluid drains from the bore.

In a second example of the hydraulic tensioner, a vent of sintered powder metal is provided within the oil supply inlet. In this case, the inlet oil is vented before it enters the chamber of the tensioner. The porosity of this vent must be greater to permit flow of oil to the chamber.

In a third example of the hydraulic tensioner, a vent of sintered powder metal is provided at the top of the spring within the plunger, but below the aperture. The vent is in the shape of a disc and spans the width of the plunger's interior space.

DETAILED DESCRIPTION OF THE PREFERRED EMBODIMENTS

Figure 1:
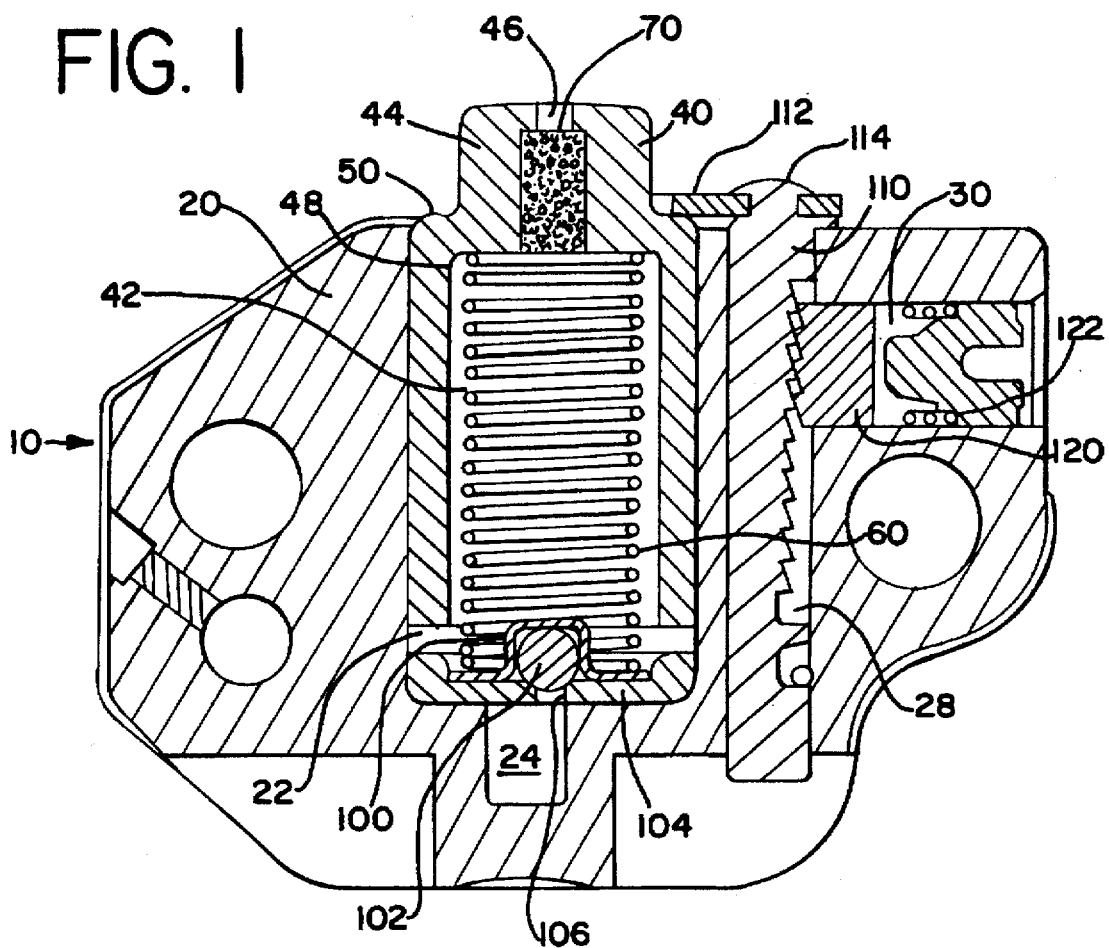
FIG. 1 is a sectional view of the first embodiment of the hydraulic tensioner with an air vent located at the end of the plunger.

FIG. 1 illustrates the hydraulic tensioner 10 incorporating the vent 70 of the present invention. The tensioner includes a housing 20 having a chamber 22 filled with fluid through a passageway 24 from a pressure fluid source (not shown). The fluid source may be an oil pump or a reservoir. The chamber, preferably cylindrical, receives a hollow plunger 40, also preferably cylindrical, having an interior space 42 and an upper end 44 with an aperture 46. Preferably, the aperture is located in the center of the upper end. The upper end 44 contacts a lever or arm (not shown) to provide tension along a chain strand. A spring 60 contacts the inside 48 of the upper end of the plunger to bias the plunger in a protruding or outward direction.

During start-up of the hydraulic chain tensioner, fluid enters through passageway 24 and fills up the chamber 22 while pushing air to the upper end of the chamber 22. As the chamber 22 fills with fluid, the plunger 40 moves outward from the chamber 22 due to the force of the spring 60 and the pressure of the fluid supplied by the external source.

A check valve 100 is provided between the chamber 22 and the passageway 24 as the source of fluid pressure to permit fluid flow into the chamber 22, while blocking fluid flow in the reverse direction. The check valve 100 includes a ball 102 and spring 104 biasing the ball toward a ball seat 106. The check valve may be a variable orifice check valve as shown and described in U.S. Pat. No. 5,259,820 and U.S. Pat. No. 5,277,664, both of which are owned by the assignee of the present application and both of which are incorporated herein by reference.

The tensioner 10 may also include a rack and ratchet assembly to provide a mechanical no-return function. In this embodiment, the housing 20 is provided with a longitudinal port 28 parallel to the chamber to a rack 110 that is outwardly movable within the port 28. The rack 110 is associated with the plunger 40 so that as the plunger 40 moves outward, the rack 110 also moves outward. The rack 110 is provided with a flange 112 at its upper end that contacts a shoulder 50 on the upper end of the plunger. The housing 20 also has a lateral cavity 30 in which a ratchet 120 and spring 122 are received. The spring 122 biases the rachet into meshing arrangement to provide a mechanical no-return function. The tensioner may include both the check valve 100 and the rack and ratchet assembly.

As the plunger 40 moves outward, the shoulder 50 contacts the flange 112 to carry the rack 110 outward. When the oil pressure decreases and the chain tension forces the plunger inward, the rack 110 remains in its last most outward position due to the ratchet. If the chain tension is sufficiently great so that the top of the plunger extends below the flange 112, the chain tension will be maintained by the top of the rack 114. The top 114 will not move inward due to the cooperation of the rack 110 and ratchet. Even when the fluid pressure is low or does not exist, the no-return function is retained by operation of the rack and ratchet assembly.

Figure 2:
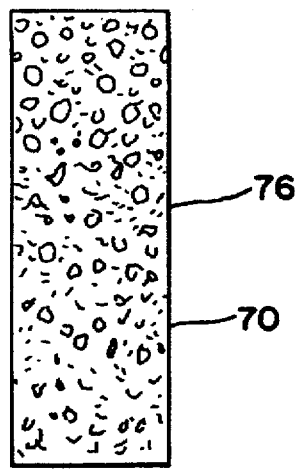
FIG. 2 is a sectional view of the porous air vent in FIG. 1.

Vent 70 of the present invention includes sintered powdered metal 76 shown in FIG. 2. The sintered powder metal is an alloy of stainless steel, bronze, Monel, Iconel, Carpenter 20 or nickel, as known in the powder metallurgy art. The sintered powdered metal 76 is in the form of a porous cake. Varying the powder particle size and density alters the micron rating of the vent 70. The larger the micron rating, the greater the flow. The flow can also be increased by changing the shape of the vent 70. For example, a longer vent would have less flow for a given pressure. Therefore, the micron rating, size and shape of the vent 70 can vary. The powder metal vent is formed conventionally by of the iron alloy and sintering at an appropriate temperature for sufficient time in a non-oxidizing atmosphere to harden the vent.

After purging the air from the tensioner 10, in the first embodiment, the sintered powdered metal 76 retains oil, based on the surface tension of the oil, such that when the plunger 40 moves, it cannot draw air into the tensioner 10 via the sintered powder metal vent 70. The tensioner 10 must have a reservoir of oil at the inlet to the tensioner 10 such that it can draw oil from this reservoir before it evacuates the oil from the sintered powder metal vent 70. Once the tensioner 10 is pressurized with engine oil pressure, it can push both air and a small quantity of oil out of the tensioner 10 through the sintered powdered metal vent 70, thus, purging any air that enters the tensioner 10. The primary reason this method of venting works is that the tensioner 10 spends the majority of its duty cycle under positive pressure and only a short period of time under vacuum. The oil saturated powdered metal vent tube 70 prevents air from entering during the short vacuum period.

Figure 3:
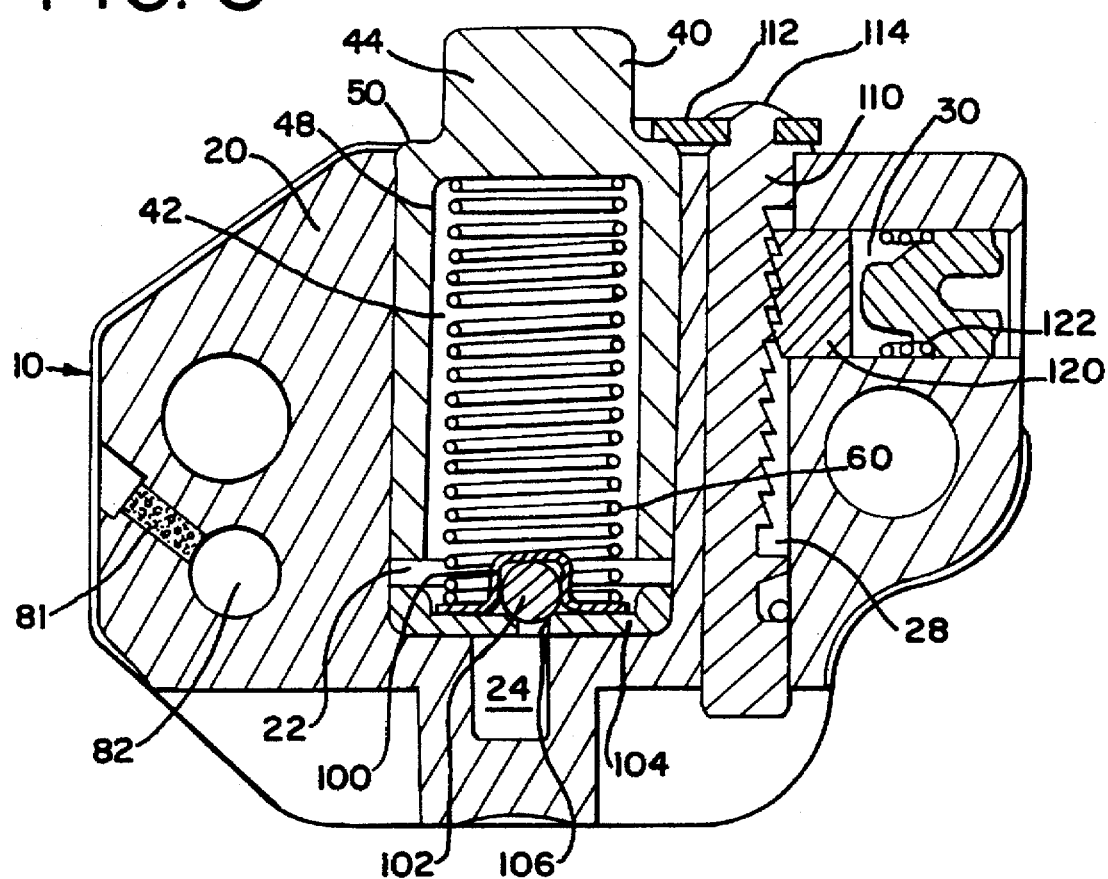
FIG. 3 is a sectional view of the second embodiment of the hydraulic tensioner with an air vent located at the oil inlet.
Figure 4:
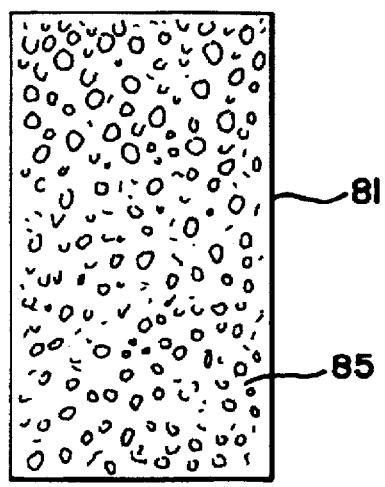
FIG. 4 is a sectional view of the porous air vent in FIG. 3.

FIG. 3 illustrates the hydraulic tensioner 10 incorporating the vent 81 in the oil supply inlet 82. As the inlet oil enters the tensioner 10, it passes through vent 81 and then enters the plunger chamber 22 of the tensioner 10. The powdered metal vent 81, shown in FIG. 4, allows oil flow to the check valve to fill the pressure chamber. The powdered metal 85 can be made of several different alloys. The hydraulic tensioner 10 of FIG. 3 operates similarly to the tensioner described in FIG. 1, except the air flow into the tensioner 10 is restricted as the inlet oil enters the tensioner 10.

Figure 5:
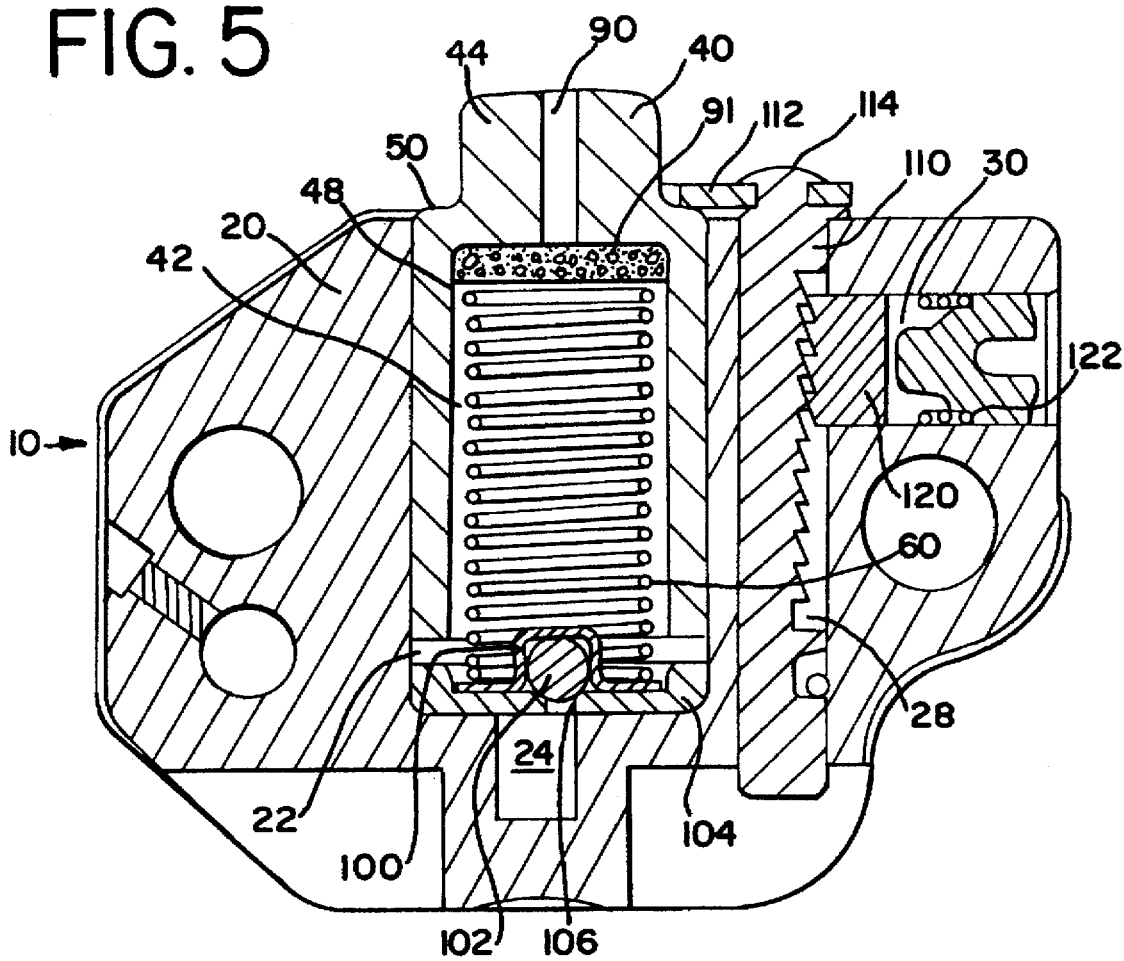
FIG. 5 is a sectional view of the third embodiment of the hydraulic tensioner with a disc-shaped air vent located at the end of the spring in the plunger.
Figure 6:
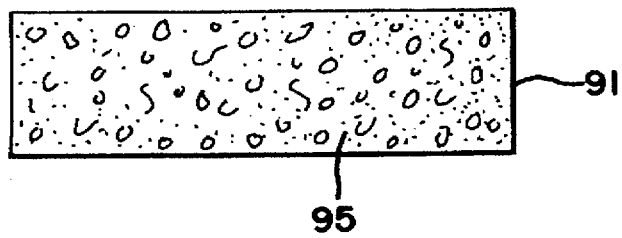
FIG. 6 is a sectional view of the porous air vent in FIG. 5.

FIG. 5 illustrates the hydraulic tensioner 10 with a disc-shaped vent 91 captured by the spring 60 in the plunger 40. The vent 91 spans the interior space 42 of the plunger 40. Chamber 22 has an aperture 90 above vent 91. The powdered metal vent 91, shown in FIG. 6, has a disc shape, as opposed to the cylindrical shape of vent 70 in FIG. 1. The powdered metal 95 can also be made of different alloys. The hydraulic tensioner of FIG. 5 operates similarly to the tensioner described in FIG. 1.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic chain tensioner comprising:

a housing having a bore, said bore defining a fluid chamber;

a hollow plunger slidably received within the bore and having an upper end, the upper end having an aperture;

a spring biasing the plunger in a protruding direction from said bore;

a check valve provided between the chamber and a source of pressurized fluid to permit fluid flow into the chamber while blocking flow in the reverse direction;

a passage in the housing to connect the chamber with the source of pressurized fluid;

a vent formed of sintered powder metal located at the upper end of said plunger, said vent is in the shape of a disc and biased by said spring against the inside of the upper end of said plunger; and a movable rack associated with the plunger; and, a ratchet biased by a spring in meshing engagement with the rack.

2. A hydraulic chain tensioner comprising:

a housing having a bore, said bore defining a fluid chamber;

a hollow plunger slidably received within the bore;

a spring biasing the plunger in protruding direction from said bore;

a check valve provided between the chamber and a source of pressurized fluid to permit fluid flow from an oil supply supply inlet into the chamber while blocking flow in the reverse direction;

a passage in the housing to connect the chamber with the source of pressurized fluid;

a vent formed of sintered powder metal located within the oil supply inlet; and a movable rack associated with the plunger, and a ratchet biased by a spring in meshing engagement with the rack.

3. The chain tensioner of claim 2 wherein said vent has a tubular shape.

4. The chain tensioner of claim 2 wherein said vent is in the shape of a disc.

* * * * *